United States Patent [19]

Bennett

[11] Patent Number: 5,797,588

[45] Date of Patent: Aug. 25, 1998

[54] CLOSURE GATE

[75] Inventor: Colin W. Bennett, Flamborough, Canada

[73] Assignee: B.N.W. Valve Manufacturing, Millgrove, Canada

[21] Appl. No.: 770,064

[22] Filed: Dec. 19, 1996

Related U.S. Application Data

[63] Continuation of Ser. No. 434,982, May 4, 1995, abandoned.

[51] Int. Cl.$^6$ ............................................. F16K 3/00
[52] U.S. Cl. ................................. 251/175; 251/326
[58] Field of Search .......................... 251/175, 326, 251/193

[56] References Cited

U.S. PATENT DOCUMENTS 2,970,803  2/1961  Harza ........................................ 251/175
3,547,152  12/1970  Hess ....................................... 251/175 X
3,692,056  9/1972  Kirkwood ............................. 251/175 X

FOREIGN PATENT DOCUMENTS 1263391  2/1972  United Kingdom ..................... 251/175

*Primary Examiner*—John Fox
*Attorney, Agent, or Firm*—Bereskin & Parr

[57] ABSTRACT

A gate to block fluid flow in a large conduit with the packing provided by fire hose or other tube extending though a U-shaped channel along the interface of the gate and the conduit surface. The tube can be a plain tube retained in the channel by retaining members attached to sides of the channel.

15 Claims, 4 Drawing Sheets

5,797,588

CLOSURE GATE

This application is a continuation of U.S. application Ser. No. 08/434,982 filed May 4, 1995, now abandoned.

FIELD OF THE INVENTION

This invention relates to gates which obstruct fluid flow in open conduits which are sometimes called stop log gates, and in particular is concerned with sealing mechanisms for such gates.

Power stations, manufacturing plants and the like often have large conduits carrying substantial quantities of fluid. Certain operations may require that flow in these types of conduits be arrested. Closure gates are one way of inhibiting fluid flow in these conduits. The gates must be very strong in order to withstand the pressure of restraining a large flow. However, the effectiveness of the gate will be diminished if it does not have a proper seal, as there will be excessive leakage of the fluid past the gate.

Ways to inhibit flow in large open conduits, and various mechanisms and means for sealing the interface of surfaces, are known. However, sealing in large conduits poses particular problems. The seal must be strong enough to withstand substantial forces when a sizeable flow is being restrained. Furthermore, controlling when the seal is operative is problematic. If the packing mechanism is always operative, it will be difficult to insert and remove the gate into and from the conduit as the sealing mechanism is likely to interfere with the conduit surface while the gate is being lowered and raised, impeding the gate's movement. Ideally, the sealing mechanism is not operative until after the gate has been fully lowered into the conduit, and can be disabled before raising the gate, thus allowing smooth transfers of the gate between open and closed positions.

One solution that has been attempted is to provide a sliding door which is transferred vertically by means of a crank and threaded bar. A sealing mechanism is attached to the perimeter of the door and is received by a slot cut into the conduit surface on the sides and bottom. The sealing mechanism itself is a complicated device including a flexible extruded member which has a flanged base and a pneumatic tube. The flanged base is compressed between two plates to anchor the tube and is also fixed to a corner piece. The pneumatic tube is connected to an air source and will expand and contract with varying levels of air within the tube. When the tube is expanded, one side of the tube contacts a wall of the slot and the corner piece is pressed against the opposite wall and corner of the slot. Thus a seal is created by the connection of the tube and the corner piece, and the slot walls.

This mechanism is complex, particularly the tube with the flanged base, and expensive to manufacture as it requires specially constructed parts. This method also interferes with the conduit's surface since a continuous slot must be included throughout the surface of the conduit to seat the device and help provide the seal.

SUMMARY OF THE INVENTION

The present invention provides a closure gate, for use in association with a conduit, consisting of a closure element to close off the conduit to fluid flow, and a sealing mechanism which has a channel frame attached to the closure element adjacent the perimeter of the closure element and defining an open channel, a flexible tube extending along the open channel, and means for connecting the flexible tube to a fluid source, for distending and collapsing said flexible tube, so that when the closure gate is inserted into a conduit, the flexible tube can be distended to contact the perimeter surface of the conduit, and seal the interface between the closure element and the conduit, and the flexible tube can be collapsed to permit movement of the closure gate.

BRIEF DESCRIPTION OF THE DRAWINGS

For a better understanding of the present invention, and to show more clearly how it may be carried into effect, reference will now be made, by way of example to the preferred embodiments of the present invention shown in the accompanying drawings in which.

DETAILED DESCRIPTION OF THE PREFERRED EMBODIMENT

Figure 1:
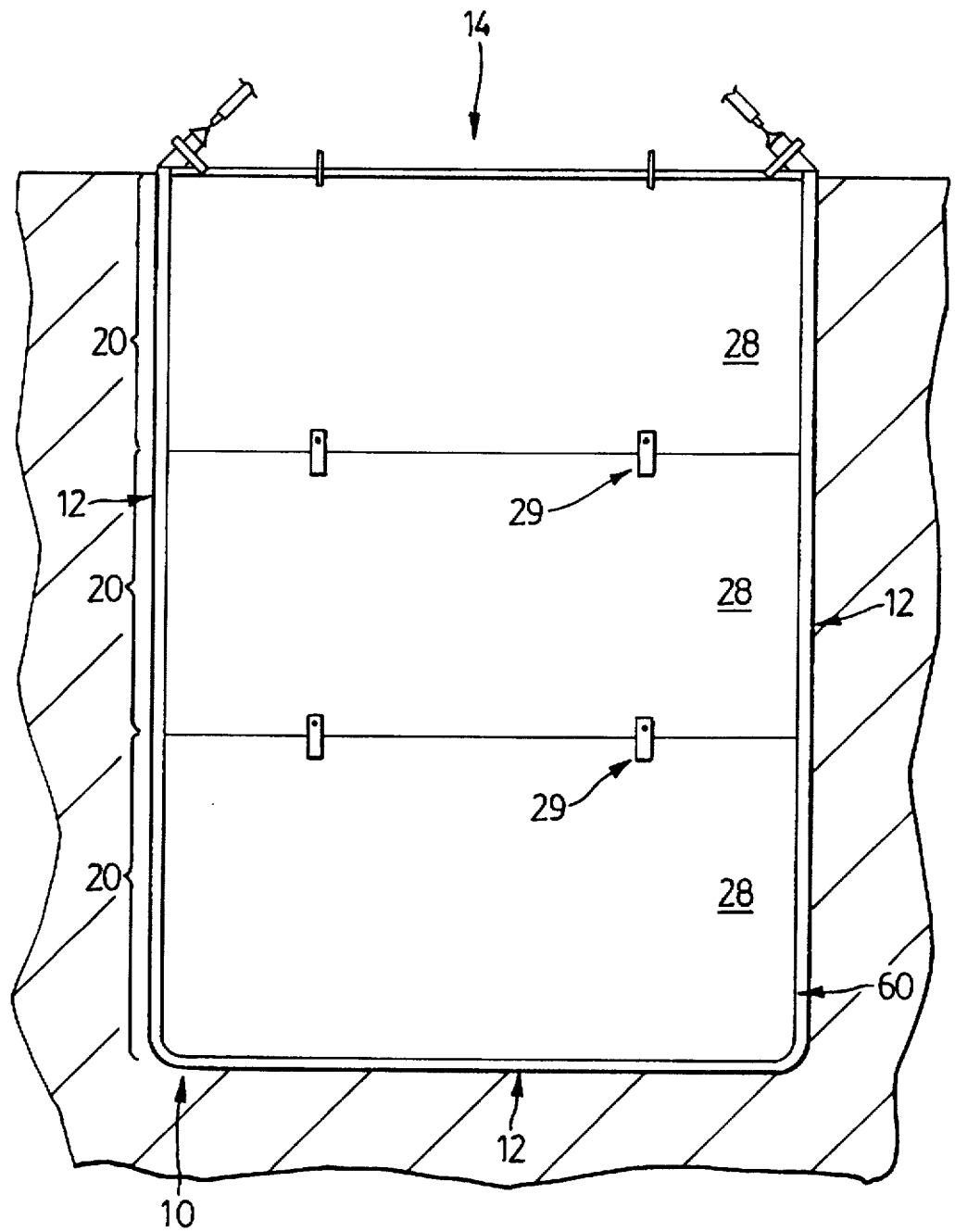
FIG. 1 is a front view of a gate in a conduit in accordance with the present invention.

Referring to FIG. 1, a stop log gate or a closure gate, indicated generally at 10, is shown inside a conduit having an interior surface 12. The gate 10 has a closure element 14 and a sealing mechanism 16. The sealing mechanism 16 extends along the perimeter of the closure element 14.

The closure element 14 blocks fluid flow within the conduit when the gate is inserted thereto. As shown in FIG. 1, the closure element 14 is made up of three panels 20. The panels are separated and sealed together by rubber gaskets. Each panel may be manufactured of carbon steel, stainless steel, aluminum or some other rigid material to suit the purchaser's requirements.

Though not shown in the Figures, some transfer means or operating mechanism must be provided to transfer the gate into and from the conduit. Conveniently, the transfer means may be a cable and winch system. However, it will be evident that any suitable method of moving the gate into and from the conduit may be used.

Figure 2:
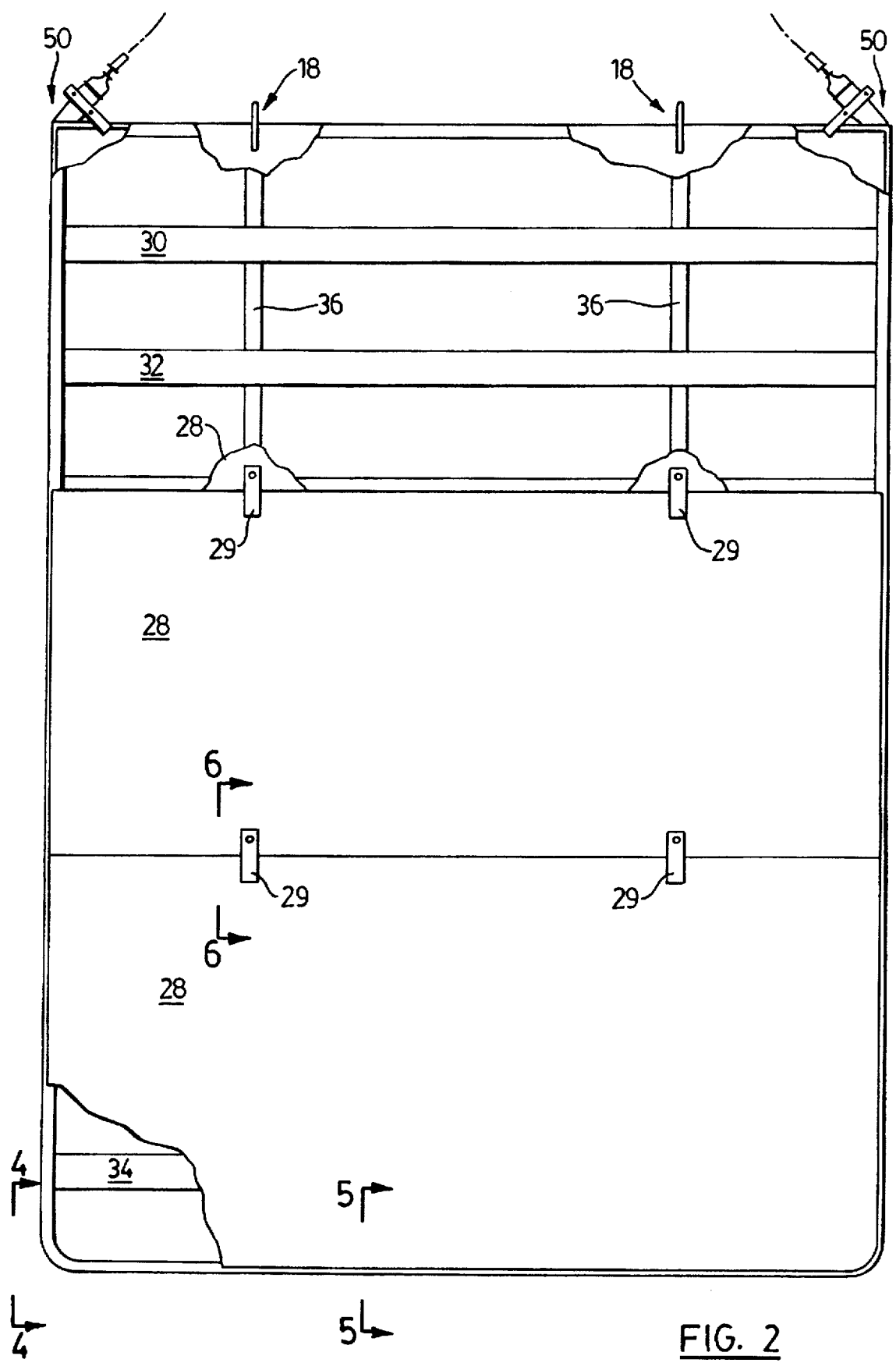
FIG. 2 is a cut away front view of the gate shown in FIG. 1.

Referring now to FIG. 2, further features of the gate may be illustrated. Each panel has a main sheet 28. The other panel 20 has been cut away to show three reinforcement members 30, 32 and 34. These reinforcement members 30, 32 and 34 comprise I beams and are three of a plurality of reinforcement members, spaced vertically along and attached to one side of the respective main sheets 28 of the closure element 14. The reinforcement members add support to the closure element 14 in restraining the fluid flow and are designed to suit the opening size of the conduit and head requirements of the flow in the conduit. Similarly, the spacing of the reinforcement members is to suit design pressure and span of the gate.

Figure 3:
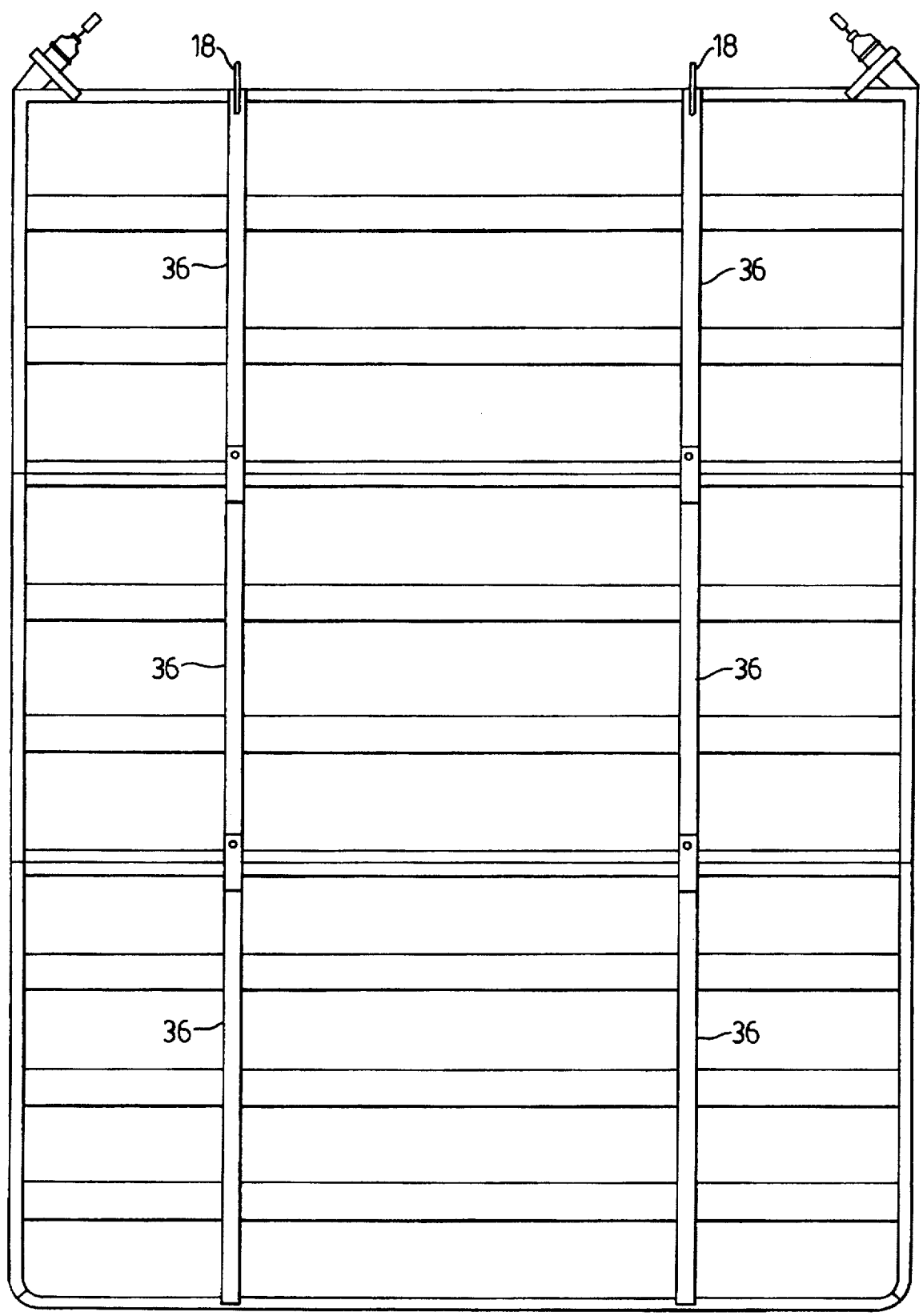
FIG. 3 is a back view of the gate shown in FIG. 1.

FIG. 3 illustrates the side of the gate opposite the main sheets 28. Conveniently, two columns of vertically aligned members 36, equi-distant from the centre of the gate, are attached to the reinforcement members on this side.

At the tops of the columns of the vertically aligned members 36 are loops 18, which are the means for attaching the gate 10 to the operating mechanism. The loops are also attached to the top panel. These loops can be adapted to function with whatever transfer means is chosen.

Figure 6:
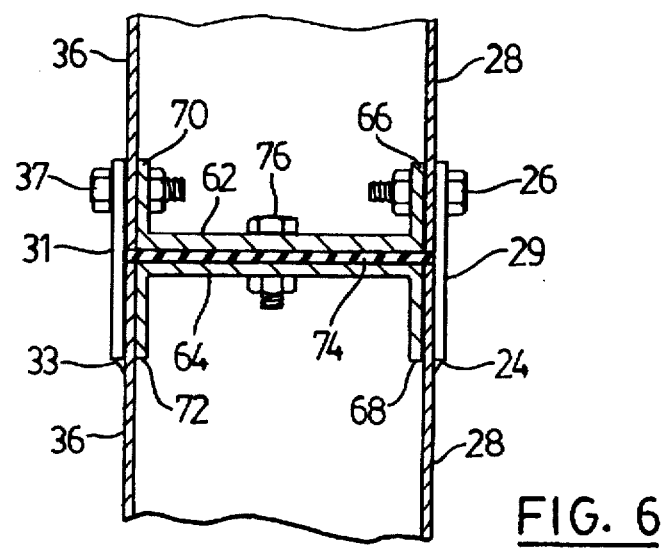
FIG. 6 is a part-sectional view taken in line 6—6 in FIG. 2.

FIG. 6 illustrates how the panels 20 are connected. At each of the abutting edges of adjacent panels 20 is a top or bottom reinforcement member 62 or 64, provided by a U-shaped channel, and welded to a main sheet 28 at an abutting edge 66 or 68 of the main sheet. Each reinforcement member 62, 64 is also welded on the opposite side from the main sheets 28 to one of abutting vertical members 36 in each column of the vertical members, see at 70 and 72. A rubber gasket 74 is placed between each pair of the reinforcement members 62, 64, and extends between the main sheet edges, 66, 68 and the abutting vertical members. Adjacent pairs of reinforcement members 62, 64 are then bolted together along their longitudinal length 76. The main sheets 28 are fastened together by means of small flanges 29 (see also FIG. 1) which are welded to one panel at 24 and bolted to another at 26. A similar combination of small flanges 31 (see also FIG. 3) are welded at one end 33 and bolted at the other 37 to the vertically aligned members 36 to attach the panels 20 on the rear side of the gate. In this way the panels may be detached from each other and replaced with relative ease and the interfaces between the panels are sealed.

Figure 5:
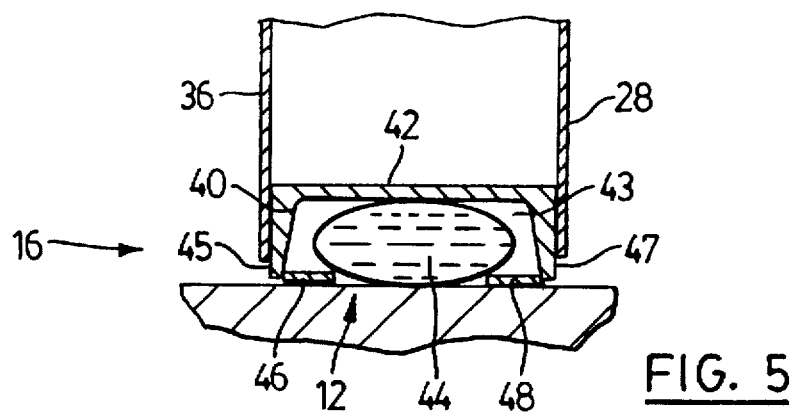
FIG. 5 is a part-sectional view taken on line 5—5 in FIG. 2.

FIG. 5 illustrates the sealing mechanism 16. The sealing mechanism 16 comprises a U-shaped open-ended channel frame 40, extending along the bottom and sides of the gate 10. The frame 40 has an elongated base 42 and shorter sides, 45 and 47. The channel frame 40 has separate sections for each of the panels 20. The channel frame 40 is situated such that the open end of a channel 43, created by the channel frame 40, is adjacent the surface of the conduit 12 along the perimeter of the conduit surface 12.

A flexible tube 44 is enclosed within the channel 43. The flexible tube 44 may be the type of hose commonly used in fire-fighting, or any other suitable hose or tube. Two lateral retaining members 46 and 48 are attached to the open end of the channel frame 40 by welding. The retaining members 46 and 48 do not meet so that there remains an opening through which the flexible tube 44 may protrude. The retaining members 46 and 48 help to seat and retain the flexible tube 44 properly by adding lateral support.

When the flexible tube 44 is distended by an input of fluid, it protrudes through the opening between the retaining members 46 and 48 contacting the conduit surface 12 to create a seal.

Figure 4:
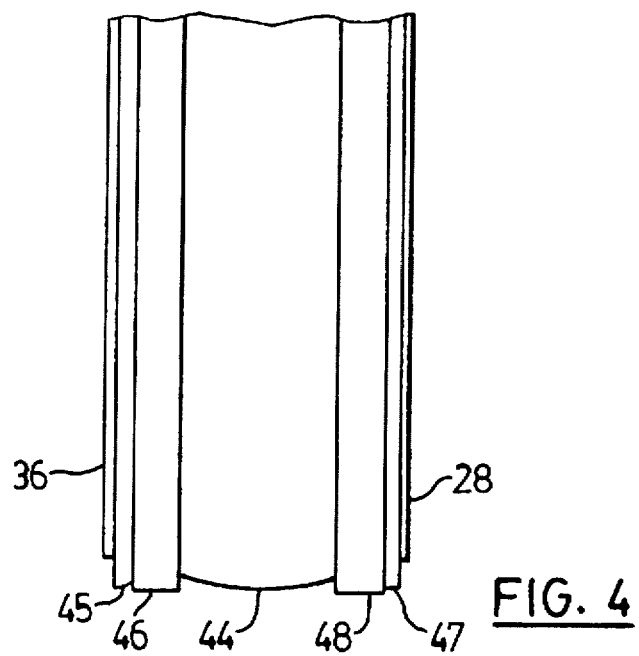
FIG. 4 is a partial side view taken on line 4—4 in FIG. 2.

FIG. 4 shows an end view of the sealing mechanism with the flexible tube 44 distended so that it protrudes through the opening between retaining members 46 and 48.

Referring back to FIG. 2, it will be seen that the combination of the reinforcement members and the sealing mechanism 16 on the perimeter of the gate provide a framework for the gate. The curvature at the corners of the gate is designed to fit the conduit and to suit the diameter of the flexible tube 44. FIG. 2 also shows two nozzles 50. The nozzles 50 are connected to a fluid source. Conveniently, the fluid source may be the domestic water supply or a compressed air source. It will be recognized, however, that any appropriate fluid source will suffice. The nozzles control the fluid pressure in the flexible tube and enable fluid flow to be reversed so that the flexible tube 44 may be distended by an input of fluid and collapsed when the fluid is removed or expelled. Control of the fluid flow is by means of valves. The combination of the nozzles 50, the fluid source and the valves provide a reversible, distending means which alternatively distends and collapses the flexible tube 44.

While two nozzles are preferred, it would be possible to provide a single nozzle.

Referring again to FIG. 1, the provision of the tube around the outside of the gate obviates the requirement for a slot, since the gate can seal directly to the sides of a channel or conduit. However, both to locate the gate 10 and take pressure loads applied to it, a guide 60 is provided. This guide 60 can be discontinuous since it provides no sealing function by itself. As before, it could be provided as a slot around a channel as is shown in FIG. 1, or alternatively as continuous or interrupted support elements mounted to the inside of a smooth conduit.

The operation of the gate and its sealing mechanism may be explained as follows. While the gate 10 is being lowered into the conduit, the flexible tube 44 is collapsed containing little or no fluid. When collapsed, the tube can be such as to adopt a flattened configuration, in which it lies entirely within the channel 43, so as to be protected. The tube 44 thus suffers little wear or abrasion during movement of the gate. Once the gate 10 is in place, the flexible tube may be distended by supply of fluid so that the flexible tube protrudes through the opening in the channel to contact the conduit surface 12. If sufficient pressure in the flexible tube 44 is maintained, the contact between the flexible tube and the conduit surface walls will form a seal between the gate and the conduit surface 12. A was evident in FIG. 4, the diameter of the flexible tube is approximately the length of the channel frame base 42. Since side walls 45 and 47 are shorter than the base 42, and the channel frame 40 is situated so that its upper ends abut the conduit surface 12, the flexible tube 44 will be oblate when distended. This gives a larger surface area of the flexible tube 44 in connection with the conduit surface 12 to create a stronger seal.

Since the sealing mechanism 16 is located on the entire perimeter of the closure element 14, the entire interface between the conduit surface 12 and the gate 10 is sealed.

When the gate 10 is to be removed, the flexible tube 44 is again collapsed by lowering the fluid level so that it no longer protrudes through the opening in the channel. Therefore the gate may be raised with the tube in collapsed form, and there is no resisting friction caused by the sealing mechanism 16 during movement of the gate 10, which could tend to abrade the tube 44.

The advantages of using this gate are that a positive hydraulic seal is created which is very effective. As well, no indention need to be made in the conduit surface to seat the gate. Finally, leakage through a seal provided by a gate constructed in accordance with the present invention has been tested and shown to be minimal and within accepted American Water Works Association (AWWA) standards.

An embodiment has been constructed in accordance with the present invention with the following dimensions and characteristics. The reinforcement members, including 30, 32, and 34, comprise 6" I-beams. The man sheets 28 are made from 3/16" plate and are sized to suit the cross-section of a particular conduit. The rubber gaskets 74 between the panels and split reinforced members are 1/8" thick. The attaching flanges 29 and 31 are 3½"×+e.fra +ee " plate by 9" long and are coupled with 1¾" A325 bolts; ½" diameter bolts shown at 76 attach the two halves of the split reinforcement members together. The loops 18 are made from ¾" diameter bar which is bent to an inner radius of 1". The flexible tube 44 is 4" diameter fire hose. The channel frame base 42 has a 6" outside dimension and the retaining members are 1¼"×3 1/16" retaining bars. The nozzles consist of a nipple, 4" long coupled with a hose clamp to the 4" fire hose, a 4"×1" reducer, and a 1" valve connected to 1" hose coupled with a pipe clamp which goes to fluid supply.

While the above description constitutes the preferred embodiment, it will be appreciated that the present invention is susceptible to modification and change without departing from the fair meaning or proper scope of the accompanying claims. For example, any suitable shape of the channel may be used, as long as the tube is seated properly and there is an opening through which the flexible tube may protrude to form the seal. As well, it is possible to have only one panel in the closure element or as many as are required.

I claim:

1. A vertically sliding closure gate for use in association with an open conduit having a perimeter surface, said closure gate comprising:

a closure element for closing off the conduit to fluid flow, and having a perimeter, said perimeter having top, bottom and two sides; and a sealing mechanism having a channel frame attached to said closure element adjacent to the bottom and two side segments only of the perimeter of said closure element said channel frame defining an open channel, a flexible, elongate, collapsible tube extending along the open channel and having a generally uniform wall thickness and a generally rounded exterior when distended, and means for connecting the tube to an external fluid source, for distending and collapsing said flexible tube, so that when said closure gate is inserted into a conduit, said flexible tube can be distended to contact the perimeter surface of said conduit and seal said closure element to said conduit, and the flexible tube can be collapsed to permit movement of the closure gate.

2. A gate as claimed in claim 1 wherein said flexible tube comprises fire hose.

3. A gate as claimed in claim 1, wherein the channel frame has a base and sides defining the open channel and includes retaining means for retaining the hose in the channel, the channel serving to protect the tube when collapsed.

4. A gate as claimed in claim 3, wherein the retaining means comprises two retaining members secured to the channel frame sides and extending inwardly, to retain the flexible tube in the channel.

5. A vertically sliding closure gate, for use in association with an open-conduit having bottom and sides and a plain perimeter surface extending around the bottom and sides thereof, the closure gate comprising:

a closure element for closing off the conduit to fluid flow, and having a top, bottom and sides, the bottom and sides corresponding to the bottom and sides of the conduit; and a sealing mechanism having a channel frame attached to said closure element and extending around the bottom and sides of the closure element only, which channel frame defines an open channel, a flexible, elongate, collapsible tube extending along the open channel and having a general uniform wall thickness and a generally rounded exterior when distended, and means mounted on top of the closure element and connected to at least one end of the flexible tube for providing a connection to an external fluid source, for distending and collapsing said flexible tube, whereby, in use, with the closure gate inserted into a conduit, said flexible tube can be distended to contact the perimeter surface of said conduit and seal said closure element to the conduit, and the flexible tube can be collapsed so as to be protected within the open channel to permit movement of the closure element relative to the conduit.

6. A gate as claimed in claim 5, wherein said means for connecting the tube comprises two nozzles, each connected to one end of the flexible tube.

7. A gate as claimed in claim 5, wherein the channel frame has a base and sides defining the open channel and includes retaining means for retaining the hose in the channel, the channel serving to protect the tube when collapsed.

8. A gate as claimed in claim 7, wherein the retaining means comprises two retaining members secured to the channel frame sides and extending inwardly, to retain the flexible tube in the channel.

9. A sealing mechanism for use with a vertically sliding closure gate in an open conduit, said sealing mechanism extending around the perimeter of said closure gate along the bottom and sides of the closure gate only, said sealing mechanism comprising:

a channel frame which is an open channel and includes a base and sides, an elongate, flexible, collapsible tube located within the open channel and having a generally uniform wall thickness and a generally rounded exterior when distended, and means for connecting the tube to an external fluid source for distending and collapsing said flexible tube, so that when said flexible tube is distended, said flexible tube extends out from the channel frame, for contacting an adjacent surface, to form a seal therewith, and when the tube is collapsed, the tube lies within the channel frame.

10. A mechanism as claimed in claim 9, wherein the tube comprises a plain tube with a generally uniform wall thickness.

11. A mechanism as claimed in claim 10 wherein said flexible tube comprises fire hose.

12. A mechanism as claimed in claim 10 wherein said means for connecting the tube comprises at least one nozzle connected to an end of the flexible tube.

13. A mechanism as claimed in claim 12 wherein said means for connecting the tube comprises two nozzles, each connected to one end of the flexible tube.

14. A mechanism as claimed in claim 10 wherein the channel frame has a base and sides defining the open channel and includes retaining means for retaining the tube in the channel, the channel serving to protect the tube when collapsed.

15. A mechanism as claimed in claim 14 wherein the retaining means comprises two retaining members secured to the channel frame sides and extending inwardly, to retain the flexible tube in the channel.

* * * * *